United States Patent
Siroker

(10) Patent No.: US 11,449,671 B2
(45) Date of Patent: Sep. 20, 2022

(54) DYNAMIC CONTENT RECOMMENDATION FOR RESPONSIVE WEBSITES

(71) Applicant: Optimizely, Inc., San Francisco, CA (US)

(72) Inventor: Dan Siroker, Palo Alto, CA (US)

(73) Assignee: OPTIMIZELY, INC., San Francisco, CA (US)

( * ) Notice: Subject to any disclaimer, the term of this patent is extended or adjusted under 35 U.S.C. 154(b) by 0 days.

(21) Appl. No.: 16/777,120

(22) Filed: Jan. 30, 2020

(65) Prior Publication Data

US 2021/0240924 A1    Aug. 5, 2021

(51) Int. Cl.
*G06F 40/197* (2020.01)
*G06Q 30/02* (2012.01)
*G06F 17/00* (2019.01)
*G06F 9/451* (2018.01)

(52) U.S. Cl.
CPC ............ *G06F 40/197* (2020.01); *G06F 9/451* (2018.02); *G06Q 30/0277* (2013.01)

(58) Field of Classification Search
CPC .... G06F 40/197; G06F 9/451; G06Q 30/0277
USPC .......................................... 715/229, 200, 234
See application file for complete search history.

(56) References Cited

U.S. PATENT DOCUMENTS

| | | | | |
|---|---|---|---|---|
| 7,739,708 B2* | 6/2010 | Carson | ................ | G06Q 30/0269 725/36 |
| 7,783,632 B2* | 8/2010 | Richardson | ........... | G06F 16/951 707/727 |
| 8,892,685 B1* | 11/2014 | Rajkumar | ............. | H04L 9/3226 709/217 |
| 9,037,975 B1* | 5/2015 | Taylor | ................. | G06F 16/9577 715/733 |
| 9,098,551 B1* | 8/2015 | Fryz | ...................... | G06F 16/951 |
| 9,122,989 B1* | 9/2015 | Morris | ................... | G06Q 30/02 |
| 9,135,344 B2* | 9/2015 | Mason | .................. | G06F 16/951 |
| 9,183,258 B1* | 11/2015 | Taylor | .............. | G06F 16/24578 |
| 9,507,831 B1* | 11/2016 | Abou Mahmoud | ........................ | G06F 16/9535 |
| 10,007,732 B2* | 6/2018 | Bennett | ............... | G06F 16/9535 |
| 10,387,512 B2* | 8/2019 | Battle | ..................... | H04L 67/30 |
| 10,558,712 B2* | 2/2020 | Zholudev | ............ | H04L 67/1044 |

(Continued)

OTHER PUBLICATIONS

Geof Reilly, Compare metric usage data with the comparison analytics overlay, Published 2021, pp. 1-2 (pdf).*
Optimizely, A/B Testing, published Oct. 2019(wayback machine) via optimizely.com, pp. 1-12 (pdf).*

*Primary Examiner* — Manglesh M Patel
(74) *Attorney, Agent, or Firm* — Womble Bond Dickinson (US) LLP

(57) ABSTRACT

A method includes detecting a first plurality of user interactions with first dynamic content of a website. The method further includes detecting a second plurality of user interactions with second dynamic content of a website. The method further includes providing a graphical user interface (GUI) that illustrates the first and second pluralities of user interactions to a client device. The method further includes determining a correlation between the first and second plurality of user interactions and a conversion metric. The method further includes determining, by a processing device, that the first dynamic content has a higher conversion metric than the second dynamic content. The method further includes sending a first variation recommendation for the first dynamic content to the client device.

20 Claims, 14 Drawing Sheets

(56) References Cited

U.S. PATENT DOCUMENTS

| | | | |
|---|---|---|---|
| 10,915,929 B1* | 2/2021 | Huang | H04N 21/4758 |
| 2006/0106709 A1* | 5/2006 | Chickering | G06Q 30/02 |
| | | | 705/37 |
| 2007/0156887 A1* | 7/2007 | Wright | G06Q 30/02 |
| | | | 709/224 |
| 2007/0299682 A1* | 12/2007 | Roth | G06Q 30/02 |
| | | | 705/1.1 |
| 2008/0097834 A1* | 4/2008 | McElfresh | G06Q 30/0247 |
| | | | 705/7.29 |
| 2009/0048902 A1* | 2/2009 | Lynn | G06Q 10/06375 |
| | | | 705/7.37 |
| 2010/0017704 A1* | 1/2010 | Jaffe | G06F 16/9535 |
| | | | 715/243 |
| 2010/0293490 A1* | 11/2010 | Rousso | G06Q 30/02 |
| | | | 715/771 |
| 2011/0066497 A1* | 3/2011 | Gopinath | G06Q 30/0255 |
| | | | 705/14.53 |
| 2013/0085859 A1* | 4/2013 | Sim | G06Q 30/02 |
| | | | 705/14.58 |
| 2013/0159505 A1* | 6/2013 | Mason | G06Q 10/00 |
| | | | 709/224 |
| 2013/0275580 A1* | 10/2013 | Chamiel | G06Q 30/0242 |
| | | | 709/224 |
| 2014/0189484 A1* | 7/2014 | Fountenberry | G06F 40/197 |
| | | | 715/229 |
| 2014/0358668 A1* | 12/2014 | Fredinburg | G06Q 30/02 |
| | | | 705/14.43 |
| 2015/0254711 A1* | 9/2015 | Chand | G06Q 30/0269 |
| | | | 705/14.53 |
| 2015/0356622 A1* | 12/2015 | Dhawan | G06Q 30/0269 |
| | | | 705/14.66 |
| 2016/0259840 A1* | 9/2016 | Zheng | G06Q 30/0277 |
| 2017/0091805 A1* | 3/2017 | Tu | G06Q 30/0244 |
| 2017/0309046 A1* | 10/2017 | Demiralp | G06T 11/206 |
| 2017/0310567 A1* | 10/2017 | Demiralp | H04L 43/08 |
| 2017/0337276 A1* | 11/2017 | Obenzinger | G06Q 30/0242 |

* cited by examiner

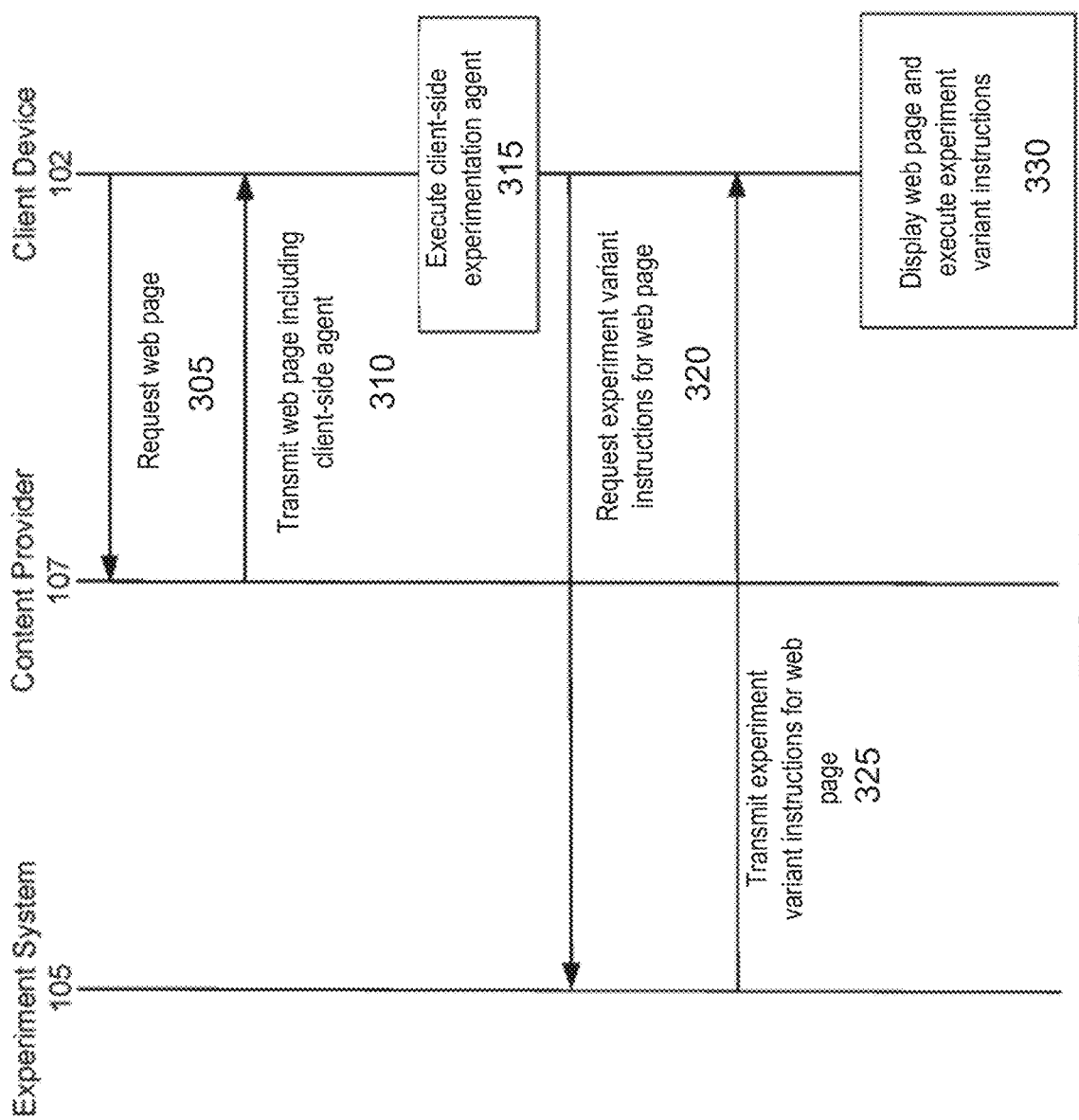

DYNAMIC CONTENT RECOMMENDATION FOR RESPONSIVE WEBSITES

FIELD OF TECHNOLOGY

The embodiments described herein pertain in general to a content recommendation service and more particularly to dynamic content recommendations for dynamic content of responsive websites.

BACKGROUND

Content variation testing is a type of experiment that tests changes to content against a current version of the content. One example of content variation testing is web page variation testing where an experiment is conducted that tests a web page (or one or more elements on the page) against another design of the web page (or one or more variations of the elements on the page). During variation testing of a web page, user interaction with a web page or its variations is measured (for example, whether a user clicks on a button or a variation of a button), and the effects of the modifications to a web page (or its elements) that produce positive or negative results are determined. The positive results associated with a particular modification to a web page validates that the modification to the web page should be used in a production version of the web page. A variety of internal and external platforms may be used in conjunction for variation testing of a web page.

BRIEF DESCRIPTION OF THE DRAWINGS

FIGS. 3A-3B are transaction diagrams illustrating interactions between an experiment system, a content provider, and a client device, according to one embodiment.

Figure 1:
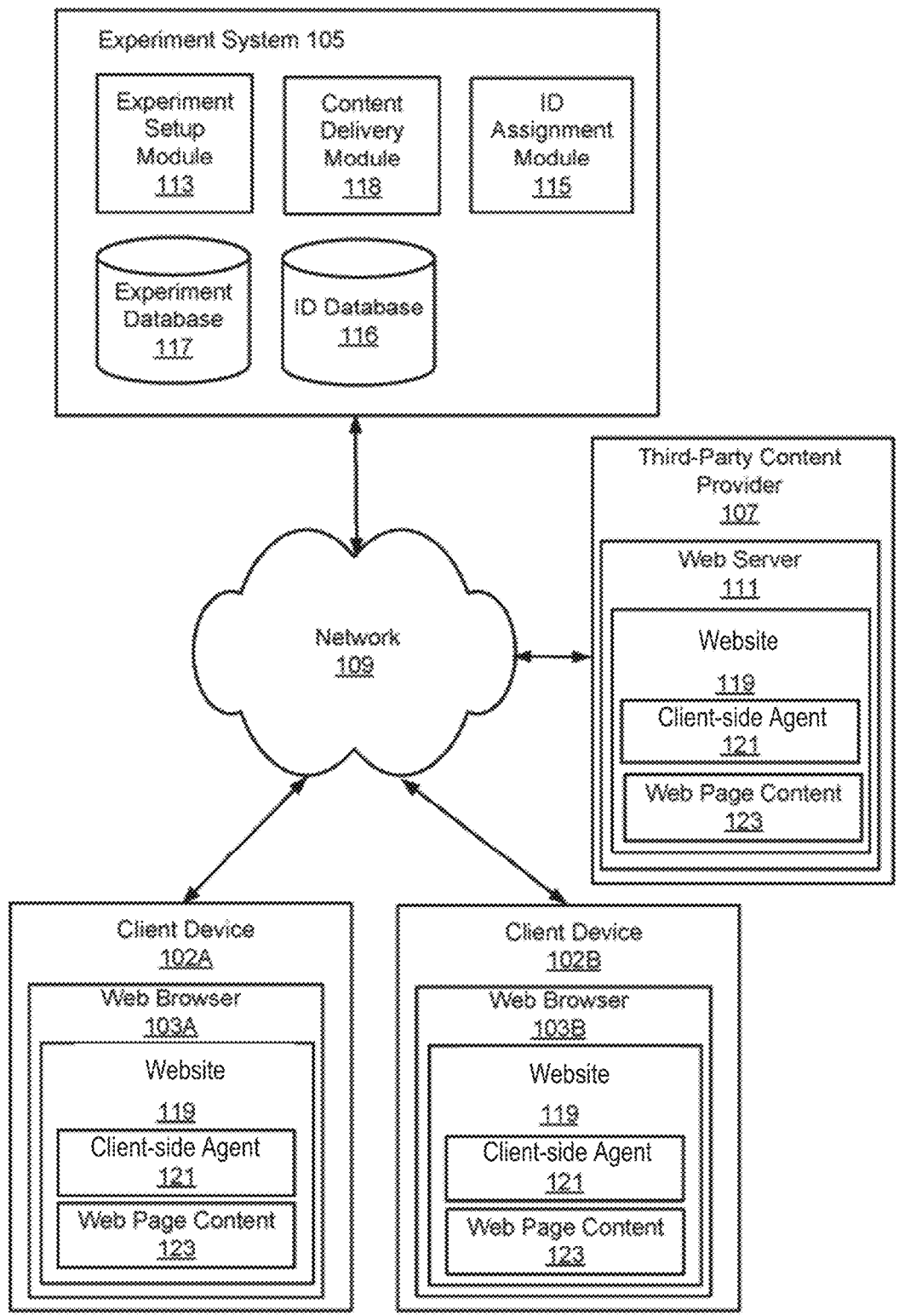
FIG. 1 is a block diagram of an experiment system environment, according to one embodiment.

The FIGS. depict an embodiment for purposes of illustration only. One skilled in the art will readily recognize from the following description that alternative embodiments of the structures and methods illustrated herein may be employed without departing from the principles described herein.

DETAILED DESCRIPTION

Content providers may run content experiments such as A/B tests (e.g., variation testing) to answer specific questions regarding which variation of a content item such as a web page or digital product (including various features) is more successful. Many content experiments include visitor criteria that determines whether a visitor is eligible for the experiment and if so, which variations of the content experiment should be shown to the visitor. The systems that implement these content experiments may be implemented in the backend of the content provider's system or as a separate node that communicates with the back end of the content provider's system. Simultaneously, content providers may bring up content delivery networks (CDNs) in the front-end of their systems to provide for content caching, including caching of content experiment variations.

In some embodiments, it would be advantageous to determine how users are interacting with, in real-time, dynamic content on responsive websites. Using such information, better decisions may be made regarding which content to display on the responsive website. In one embodiment, a responsive website is one that that includes dynamic content that responds to changes in device characteristics as well as user preferences and actions. For example, a responsive website may consist of a mix of flexible grids and layouts, images and an intelligent use of CSS media queries. As the user switches from a laptop to a tablet, the website may automatically switch to accommodate for resolution, image size and scripting abilities.

In one embodiment, dynamic content on a responsive website may react in response to user interaction with the responsive website. Examples of dynamic content include dropdown menus, text and image overlays (e.g., that appear when activated, and otherwise remain hidden), and other content that changes characteristics upon satisfaction of a condition (e.g., upon user touch or other activation). Dynamic content may also be referred to adaptive content, referring to any content that changes based on behavior, preferences, or interests of a user or user device.

The embodiments described herein provide for an efficient way to determine how users are interacting with, in real-time, dynamic content on responsive websites by generating and displaying a dynamic heatmap on a user-friendly GUI. In one embodiment, a heatmap is a graphical representation of data that uses a system of color-coding to represent different values. Heatmaps may be used in various forms of analytics, including identifying user behavior on specific webpages or webpage templates. Heatmaps can be used to show where users have clicked on a page, how far they have scrolled down a page, or used to display the results of eye-tracking tests.

Advantageously, the embodiments described herein provide for an efficient and clear way to generate and view analytics associated with user engagement on responsive websites with a dynamic heatmap (e.g., a heatmap that is capable of use with dynamic content of responsive webpages). Generation and display of such analytics poses particular challenges with respect to responsive websites, which are overcome by utilization of the embodiments described herein.

Although responsive websites are references herein merely for convenience and clarity, the embodiments described herein are equally capable of being performed in conjunction with other forms of dynamic content, such as dynamic mobile and web applications. Furthermore, although the embodiments are described herein with respect to an experimentation system (e.g., to provide A/B testing), the embodiments are equally capable of being performed outside of an experimentation system, in a variety of contexts. By providing these benefits and others, experimentation systems and other content analysis platforms are provided more flexibility to perform operations otherwise not possible.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. In one embodiment, experiment system includes one or more experimentation platforms to configure experiments and/or program management platforms to manage the experiment system. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

The network 109 enables communication among the entities connected to it. In one embodiment, network 109 is the Internet and uses standard communications technologies and/or protocols. Thus, network 109 can include links using technologies such as Ethernet, Wi-Fi (e.g., 802.11), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (NIPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). The web browser 103 is a computer program stored on a client device 102 that allows the user of client 102 to access web pages on the World Wide Web such as websites 119 provided by the third-party content provider 107. Suitable web browsers include, but are not limited to, GOOGLE CHROME, MICROSOFT INTERNET EXPLORER, MICROSOFT EDGE, MOZILLA FIREFOX, and APPLE SAFARI. In addition to web browsers, a client device may process a web page in an environment like NODE.JS, in which an experiment system and other third-party content providers may execute JavaScript code in an interpreter with support for microtask and macrotask queues.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 are included as part of a website 119 (e.g., a dynamic website or application). For example, the content provider 107 may provide content items such as navigation bars, backgrounds, call to action buttons, links, CSS styles, pop-ups, video, audio, a combination of video and audio, still images (e.g., JPEG), text documents, advertisements, and/or any other types of content. For purposes of convenience and the description of one embodiment, the content items provided by the content provider 107 will be referred to as a single-page web pages, but no limitation on the type of content items are intended by this terminology. In one embodiment, a single-page web page refers to a view of a website 119. For example, a single-page web page may be the initial view of a website 119 when the user first loads the website 119 or the view when the user navigates over a navigation bar element and a menu is displayed in response to the navigation over the navigation bar. In other embodiments, a single-page web page may refer to any other type of dynamic website or dynamic application.

In one embodiment, the content provider 107 operates in conjunction with the experiment system 105 to perform variation testing on a website 119 containing one or more single-page web pages. In one embodiment, the content provider 107 sends a single-page web page to client devices 102 together with a client-side experimentation agent 121, which includes or subsequently downloads from the experiment system 105 conditions and instructions for modifying the single-page web page. A variation test for a single-page web page of a website 119 tests changes to the single-page web page against the current variation of the single-page web page (e.g., the original version of the single-page web page) to determine how the variation alters user interaction with the web page or whether the changes produce a desired result. An example of a desired result resulting from a change to a single-page web page is an increased interaction with the web page such as an increased selection of an advertisement(s) included in the single-page web page or increased purchases of a product advertised on a single-page web page. Thus, variation testing validates a new design of a single-page web page or changes on elements on the single-page web page before the new design or changes are put into production by the content provider 107.

For a given single-page web page, the content provider 107 may have an associated smart page that includes one or more variations of the single-page web page that are used in a variation test for the single-page web page. In one embodiment, a variation test of a single-page web page involves an experiment that tests control "A" and a variation "B" on users requesting the single-page web page from the content provider 107. For ease of discussion, the embodiments discussed herein describe a web page having only two variations: the control and the variant. However, in other embodiments, a single page web page can have any number of variations.

In one embodiment, system 100 may be used to provide for dynamic heatmap generation for dynamic content of responsive webpages. For example, in one embodiment, the system may include a memory to store a graphical user interface (GUI); and a processing device, operatively coupled to the memory, to: detect a user interaction with dynamic content of a responsive website (e.g., website 119). For example, memory and processing device may be located on, or otherwise associated with, client device 102A/B. In another embodiment, the memory and or/processing device are located on, or otherwise associated with experiment system 105 and/or third-party content provider 107.

In one embodiment, experiment system 105 may provide, to a client device (e.g., client device 102A) for display, the GUI comprising a dynamic heatmap overlaid on the responsive website (e.g., website 119), the dynamic heatmap identifying the user interaction in real-time (e.g., or substantially real-time—concurrently with the user interaction being performed, within several milliseconds of such, etc.). In one embodiment, user interaction may occur on a first client device (e.g., client device 102B), and the dynamic heatmap may be provided for display on a second client device (e.g., client device 102A).

In one embodiment, the processing device is further to determine differences between user interactions with two variations (e.g., variations 200A and 200B of FIGS. 2A and 2B) of the responsive website, generate a delta heatmap identifying the differences between the user interactions; and provide the GUI comprising the delta heatmap overlaid on the responsive website for display on the client device (e.g., client device 102A). In another embodiment, the processing device is further to automatically refresh the dynamic heatmap and corresponding GUI by receiving an indication that a user activated previously hidden dynamic content on the responsive website. In response to receiving the indication, the system 100 may regenerate the dynamic heatmap to show user interaction with the previously hidden dynamic content and provide, to the client device (e.g., client device 102A) for display, the GUI comprising the regenerated dynamic heatmap overlaid on the responsive website (e.g., website 119), the dynamic heatmap identifying the user interaction with the previously hidden dynamic content in real-time. In one embodiment, the processing device is further capable of dynamically (e.g., automatically, without human interaction, etc.) refreshing the GUI and corresponding dynamic heatmap to show new user interactions with the responsive website. Advantageously, this allows analytics to be displayed as user interactions are occurring, and analyzed in real-time.

In one embodiment, the processing device is further to provide, via the GUI, an interactive representation of a timeline associated with the dynamic heatmap, wherein only user interactions within an active time period of the timeline are provided for display on the dynamic heatmap. For example, a user may be able to select an active period of time from the displayed timeline, such that the timeline includes an active period and an inactive period. Upon receiving indication of such a selection, system 100 may limit the results shown by the dynamic heatmap to only include user interactions and occurred within the active period.

In another embodiment, the processing device may be further to generate a filtered subset of user interactions corresponding to a device characteristic and provide, to the client device for display, the GUI comprising a filtered dynamic heatmap overlaid on the responsive website, the filtered dynamic heatmap identifying the filtered subset of user interactions in real-time. In one embodiment, a device characteristic may include a device type, size, brand, etc. In one embodiment, display and interaction with the dynamic heatmap functionality described herein is provided via a browser extension that may be installed an uninstalled at will.

Figure 2B:
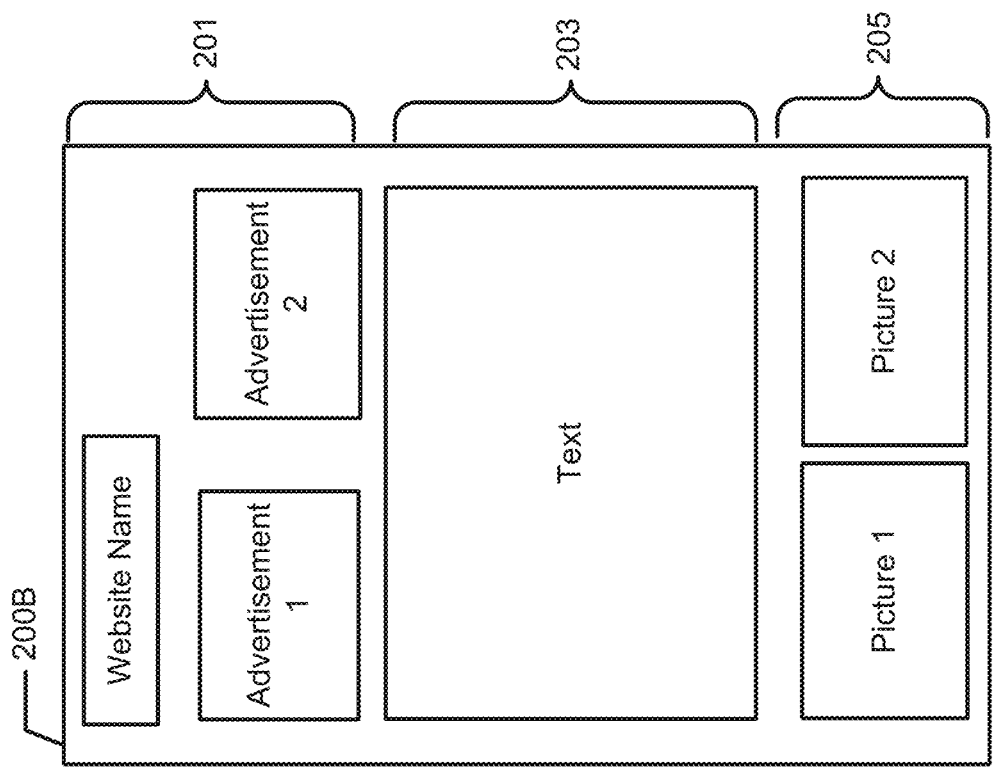
FIGS. 2A and 2B are example variations of a web page, according to one embodiment.
Figure 2A:
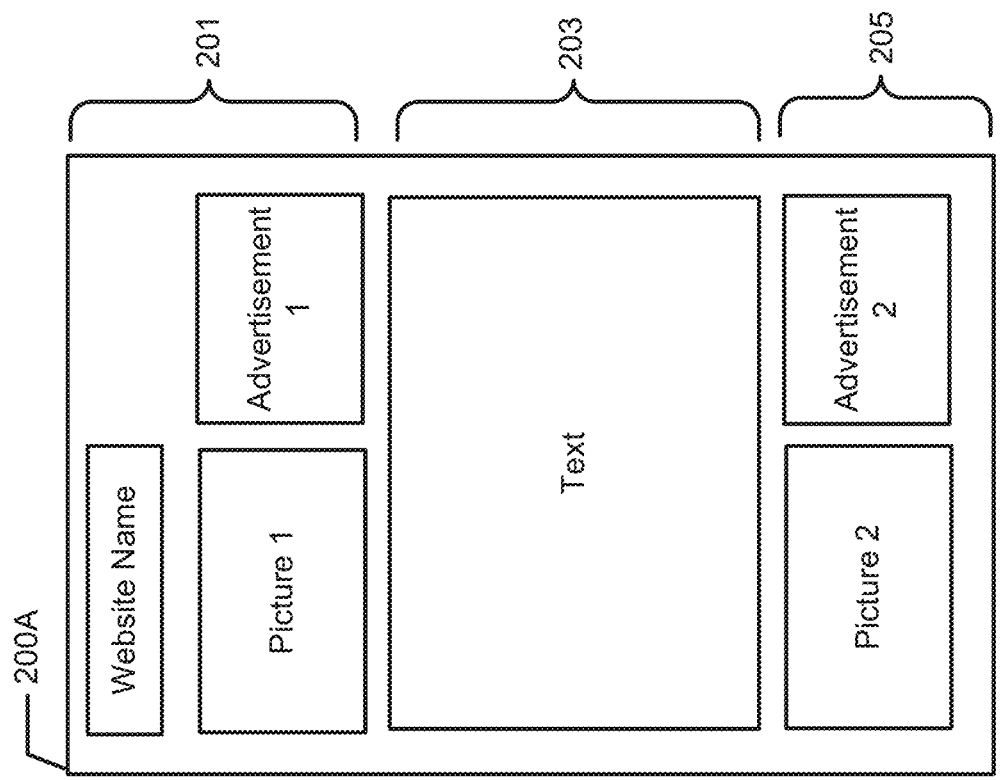

FIG. 2A is example "A" (e.g., the control) of a single-page web page 200A that represents the current implementation of the single-page web page provided by content provider 107. The control of the single-page web page 200A includes a website name of the website associated with the single-page web page, a first picture, and a first advertisement. The website name, the first picture, and the first advertisement are located in an upper portion 201 of the control of single-page web page 200A according to one embodiment. The control of single-page web page 200A also includes textual content located in a central portion 203 of the control of single-page web page 200A and the control of the single-page web page 200A also includes a second picture and a second advertisement located at a lower portion 205 of the control of the single-page web page 200A.

FIG. 2B is example "B" (e.g., the variant version) of a single-page web page 200B. The variant of the single-page web page represented by web page 200B includes a change (i.e., a modification) to the control of the single-page web page 200A shown in FIG. 2A. The variant of single-page web page 200B includes the website name, a first advertisement, a second advertisement, textual content, a first picture, and a second picture similar to the control of the single-page web page 200A shown in FIG. 2A. However, the variant of single-page web page 200B includes the second advertisement positioned in the upper portion 201 of single-page web page 200B whereas the second advertisement is positioned in the lower portion 205 in the control of the single-page web page 200A. In one embodiment, the variation test using the control and the variant of the single-page web page is conducted to determine whether the second advertisement receives more selections when the second advertisement is located at the lower portion 205 of the single-page web page as shown in FIG. 2A or when the second advertisement is located at the upper portion 201 of the single-page web page as shown in FIG. 2B. Noteworthy, any content of 201, 203, and 205 may be dynamic content that changes in according with a variety of conditions, as discussed herein.

Referring back to FIG. 1, in one embodiment the content provider 107 includes a web server 111. In one embodiment, the web server 109 links the content provider 107 to one or more client devices 102 and the experiment system 105 via the network 109. The web server 111 serves websites 119, as well as other web related content 123 for the website 119, such as Java, Flash, XML, and so forth. The web server 111 may include a mail server or other messaging functionality for receiving and routing messages between the experiment system 105 and one or more client devices 102. In one embodiment, a website 119 provided by the web server 109 may include a client-side experimentation agent 121. The client-side experimentation agent 121 may be added to the website 119 by the third-party content provider 107 in one embodiment. The client-side experimentation agent 121 comprises code that loads experiment variation instructions from the experiment system 105.

As shown in FIG. 1, the variant testing system environment 100 also includes an experiment system 105. In one embodiment, the experiment system 105 establishes and conducts variation experiments for web pages included in websites 119 served by third party providers 107. In one embodiment, the experiment system 105 includes an experiment setup module 113, an ID assignment module 115, an ID database 116, an experiment database 117, and a content delivery module 118, according to one embodiment. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by one or more computer processors. Additionally, those of skill in the art will recognize that other embodiments of the experiment system 105 shown in FIG. 1 can have different and/or other modules than the ones described here, and that the functionalities can be distributed among the modules in a different manner.

In one embodiment, the experiment setup module 113 establishes experiments for websites 119 provided by the third-party content provider 107. The experiment setup module 113 receives input from an affiliate (e.g., an employee) of the third-party content provider 107 to establish a variation experiment for a single-page web page of a website 119 provided by the third-party content provider 107. In one embodiment, establishing a variation experiment for a single-page web page of a website 119 includes configuring a smart page for the single-page web page. In one embodiment, a smart page for a single-page web page is a set of instructions that describe when to activate a variation experiment associated with the single-page web page. The smart page may include one or more triggers and one or more conditions configured by the affiliate of the third-party content provider 107 that impact when variations of the associated single-page web page are selected and presented to a client device 102.

A smart page for a single-page web page may define one or more conditions. In one embodiment, a condition(s) for a smart page is a set of rules related to the state of the single-page web page that must be satisfied before the smart page for the single-page web page will activate. That is, a condition of a smart page describes the state of the world of the single-page web page that can be evaluated as true (i.e., valid) or false (i.e., invalid). Responsive to a condition being true, a smart page causes the performance of a specified action. For example, information included in the smart page specifies when and how to present experimental variants of the website 119 to viewing users if a condition in the smart-page is true. If a condition is false, the smart page may be deactivated if the smart page is currently active or the smart page may not be activated if not currently activated.

In one embodiment, a smart page for the single-page web page may also include at least one trigger. In one embodiment, a trigger defines when to evaluate the condition(s) for the smart page. That is, a trigger of a smart page is tied to an event on the single-page web page and signals a client device 102 to evaluate conditions associated with the trigger. Smart pages may include one or more triggers that can be of different trigger types. When a trigger event occurs, the smart page evaluates the corresponding conditions associated with the trigger event.

Figure 3B:
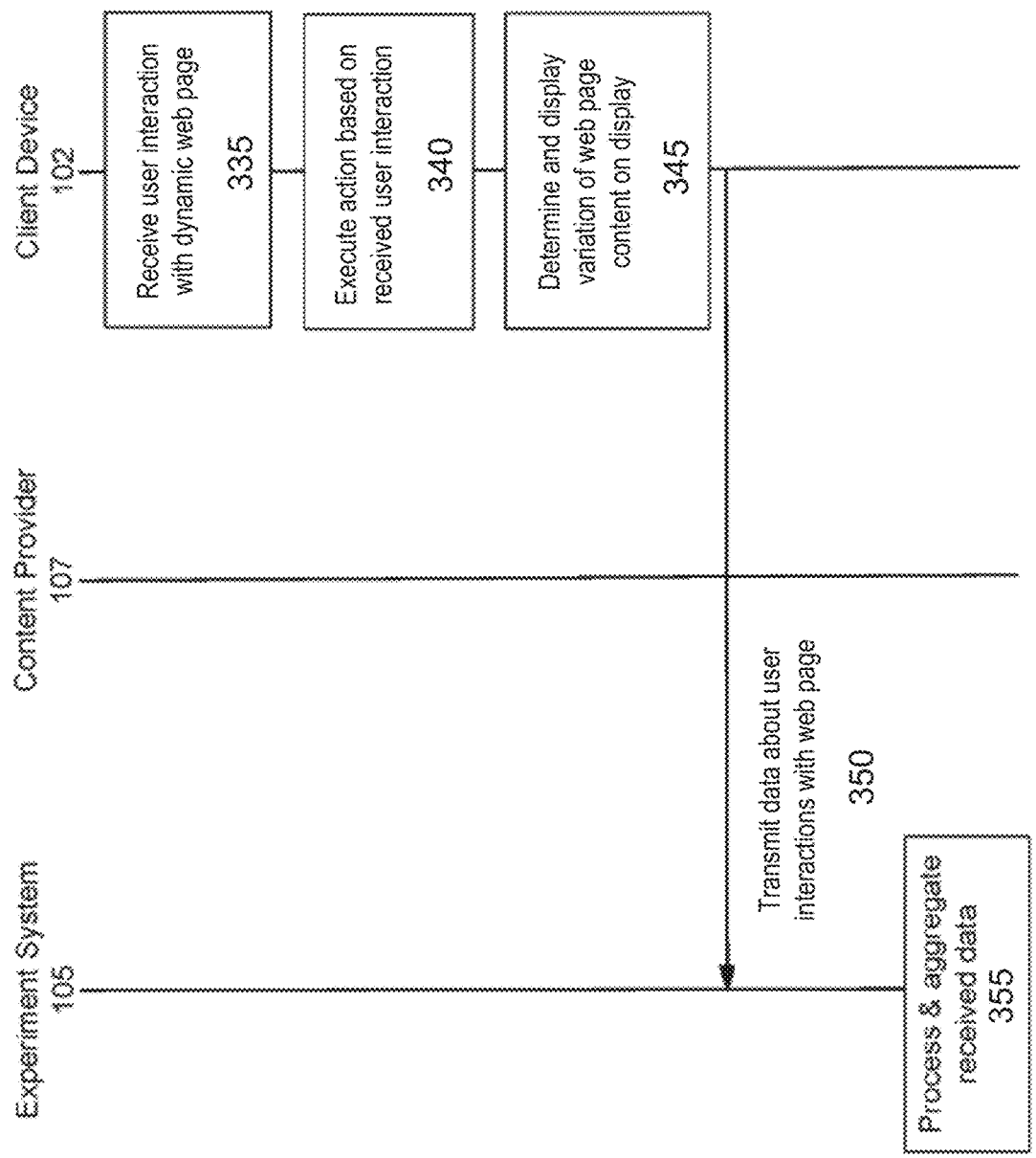

FIGS. 3A-3B are transaction diagrams illustrating interactions between an experiment system 105, a content provider 107, and a client device 102. In one embodiment, the experiment system 105 may be on the client device 102. In another embodiment, the experiment system 105 is separate from the client device 102, as shown. A client device 102 requests 305 a website 119 from a content provider 107. The content provider 107 transmits 310 the website 119 to the client device 102. The transmitted website 119 includes a client-side experimentation agent 121. The client-side experimentation agent 121 includes instructions that cause the client device 102 to retrieve from the experiment system 105 additional configurations or variations to perform alterations on the web page or its content (e.g., web page elements), including, in one embodiment, the triggers and conditions for one or more smart pages. Furthermore, experiment system 105 may log user interaction with the web page for analysis and display of dynamic heatmaps on a client device 102. The client device 102 executes 315 the client-side experimentation agent 121 which causes the client device 102 to request 320 instructions for executing experiment variants for a single-page web page of the website 119 from the experiment system 105. The experiment system 105 transmits 325 the experiment variant instructions for the single-page web page of the website 119 to the client device 102. The instructions include the triggers and conditions for the smart pages and where they are stored in the client-side experimentation agent 121 within the web browser 103. The client device 102 displays 330 the single-page web page to a user of the client device 102 and executes the web browser 103 and the client-side experimentation agent containing the experiment variant instructions.

The client-side experimentation agent 121 contains instructions to allow it to interact with the web browser 103, including instructions to interact with the web browser's APIs. For example, the client-side experimentation agent 121 contains instructions to interact with the MutationObserver API. The MutationObserver API provides the ability to watch for changes being made to the DOM tree by identifying a target element. The target element may be a single node in the DOM tree or a subtree including multiple nodes. When a change occurs to the identified target element, such as adding, modifying, and removing nodes or node attributes and modifying text data, additional code can be configured using the MutationObserver API to watch for changes and transmit them to the client-side experimentation agent 121. In another example, the client-side experimentation agent 121 interacts with a site visitor's web browser session history. In one example, the client-side experimentation agent 121 detects when a URL changes even if the full page does not reload in order to execute experiments.

Referring to FIG. 3B, the client device 102 receives 335 a user's interactions with the website 119 that has been loaded onto the browser running on the client device 102. For example, the client device 102 identifies a user interaction of clicking or selecting a menu item of the single-page web page and passes the user interaction to the browser for execution by the website 119. The user interaction may be recorded for analysis and represented on a dynamic heatmap for display on client device 102. In another embodiment, the client device 102 executes 340 an action associated with the user interaction in the browser. The action executed by the client device 102 includes displaying the selected menu item (e.g., updating an element of the web page). The client device 102 determines 345 a variation of the single-page web page to display (e.g., including a variation of an element to display) to the user based on the experiment variant instructions and the user interactions. Responsive to the client device 102 displaying the determined variation of the single-page web page, the client device 102 using the client-side experimentation agent may monitor for changes to the state of the single page web application 119 and transmit 350 data about user interactions with the single-page web page to the experiment system 105. The experiment system 105 processes and aggregates 355 the received data. In one embodiment, such data may be used to generate the dynamic heatmap, as described herein.

Figure 4A:
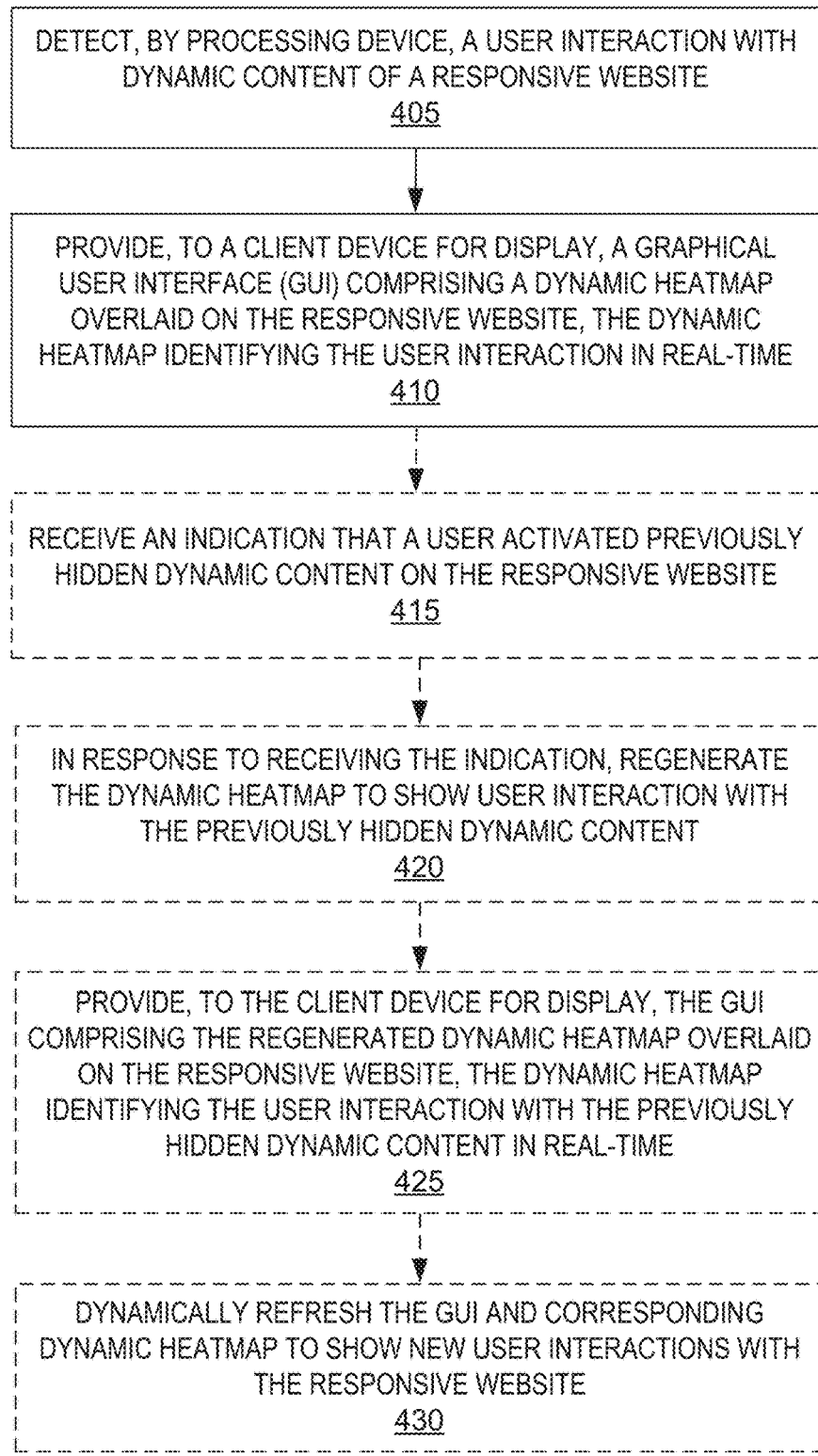
FIG. 4A is a first flow diagram of a method of a dynamic heatmap generation for dynamic content of responsive websites, according to one embodiment.

FIG. 4A is a first flow diagram of a method 400A of a dynamic heatmap generation for dynamic content of responsive websites, according to one embodiment. Method 400A may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400A may be performed by the components of system 100 of FIG. 1. Some or all of the steps may be performed by other entities in other embodiments. In addition, other embodiments may include different and/or additional steps, and the steps may be performed in different orders.

In one embodiment, the steps of FIG. 4A may be performed by processing logic of experiment system 105 of FIG. 1. For example, in one embodiment, processing logic at block 405 may detect a user interaction with dynamic content of a responsive website (e.g., website 119 of FIG. 1). At block 410, processing logic may provide, to a client device (e.g., client device 102A of FIG. 1) for display, a GUI that includes a dynamic heatmap overlaid on the responsive website (e.g., website 119 of FIG. 1). In one embodiment, the dynamic heatmap may illustrate or otherwise identify the user interaction. In one embodiment, the user interaction is shown on the dynamic heatmap immediately after being performed, e.g., in real-time (or substantially real-time—concurrently with the user interaction being performed, within several milliseconds of such, etc.). In one embodiment, user interaction may occur on a first client device (e.g., client device 102B of FIG. 1), and the dynamic heatmap may be provided for display on a second client device (e.g., client device 102A of FIG. 1).

In one embodiment, processing logic may automatically refresh the dynamic heatmap and corresponding GUI by receiving an indication that a user activated previously hidden dynamic content on the responsive website (block 415). In response to receiving the indication (block 420), processing logic may regenerate the dynamic heatmap to show user interaction with the previously hidden dynamic content and provide (block 425), to a client device (e.g., client device 102A of FIG. 1) for display, the GUI including the regenerated dynamic heatmap overlaid on the responsive website (e.g., website 119 of FIG. 1). In one embodiment, the dynamic heatmap identifies the user interaction with the previously hidden dynamic content in real-time, as described above. In one embodiment, processing logic is further capable of dynamically (e.g., automatically, without human interaction, etc.) refreshing the GUI and corresponding dynamic heatmap to show new user interactions with the responsive website (block 430). Advantageously, this allows analytics to be displayed as user interactions are occurring, and analyzed in real-time.

In one embodiment, processing logic may provide, via the GUI, an interactive representation of a timeline associated with the dynamic heatmap, wherein only user interactions within an active time period of the timeline are provided for display on the dynamic heatmap. For example, a user may be able to select an active period of time from the displayed timeline, such that the timeline includes an active period and an inactive period. Upon receiving indication of such a selection, processing logic may limit the results shown by the dynamic heatmap to only include user interactions and occurred within the active period.

In another embodiment, processing logic may generate a filtered subset of user interactions corresponding to a device characteristic and provide, to the client device for display, the GUI comprising a filtered dynamic heatmap overlaid on the responsive website, the filtered dynamic heatmap identifying the filtered subset of user interactions in real-time. In one embodiment, a device characteristic may include a device type, size, brand, etc. of the device. In one embodiment, display and interaction with the dynamic heatmap functionality described herein is provided via a browser extension that may be installed an uninstalled at will on the client device.

Figure 4B:
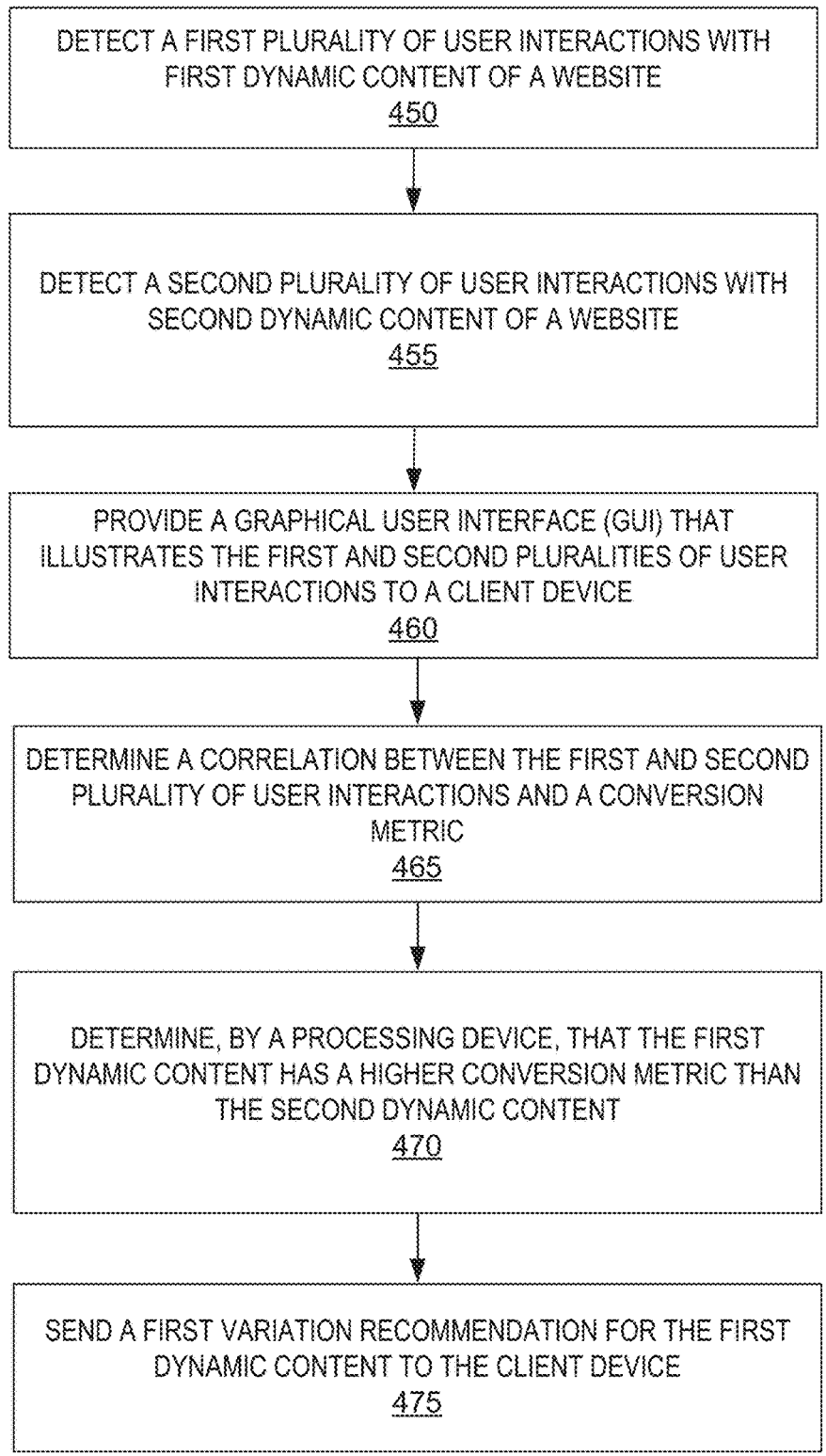
FIG. 4B is a flow diagram of a method of a dynamic content recommendation for responsive websites, according to one embodiment.

FIG. 4B is a flow diagram of a method 400B of a dynamic content recommendation for responsive websites, according to one embodiment. Method 400B may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400B may be performed by the components of system 100 of FIG. 1. Some or all of the steps may be performed by other entities in other embodiments. In addition, other embodiments may include different and/or additional steps, and the steps may be performed in different orders.

In one embodiment, the steps of FIG. 4B may be performed by processing logic of experiment system 105 of FIG. 1. For example, in one embodiment, processing logic at block 450 may detect a first plurality of user interactions with first dynamic content of a website. In another embodiment, processing logic may detect a single user interaction the first dynamic content. At block 455, processing logic may detect a second plurality of user interactions (or single user interaction) with second dynamic content of a website.

Optionally, processing logic may receive an attribute corresponding to the first or second dynamic content from the client device. In one embodiment, the attribute may identify a type of the dynamic content. In one embodiment, the first and second dynamic content are different types of dynamic content (e.g., color, size, text (e.g., within a button), image, audio, video, location, button or other graphical element, etc.). In another embodiment, the first and second dynamic content are the same type of dynamic content, but differ in the content itself. For example, the first and second dynamic content may both be textual content, but may include different text. For example, the first dynamic content may be the text "Click Here" and the second dynamic content may be the text "Act Now."

In one embodiment, the attribute may include text to be displayed with the corresponding first or second dynamic content, and processing logic may generate a value score corresponding to the text. Processing logic may optionally provide a recommendation for improved text corresponding to a higher value score to the client device. For example, based on data processing logic may collect about conversion metrics, processing logic can generate a model that associates certain words with higher conversion metrics. Processing logic may then recommend that the user (e.g., via display on a client device) change the text to include to those words, which may advantageously lead to higher conversion metric.

At block 460, processing logic may provide a graphical user interface (GUI) that illustrates the first and second pluralities of user interactions to a client device. For example, the first and second plurality of user interactions may be displayed on the GUI with other optional information and in any suitable form. At block 465, processing logic determines a correlation between the first and second plurality of user interactions and a conversion metric. In one embodiment, the conversion metric may identify a number of times a user has interacted with the first and second dynamic content, respectively. In one embodiment, users may interact with dynamic content in any one of a variety of ways, including but not limited to clicking, hovering, holding down on, or otherwise act upon dynamic content.

At block 470, processing logic determines, by a processing device, that the first dynamic content has a higher conversion metric than the second dynamic content. In one embodiment, a higher conversion metric means that the related content was interacted with more than the other content (e.g., the second content, in this example). At block 475, processing logic may send a first variation recommendation for the first dynamic content to the client device in response to the first dynamic content having a higher conversion metric.

Optionally, processing logic may generate a recommendation for changes to the first or second dynamic content based on the attribute and provide the recommendation to the client device. For example, processing logic may recommend a third dynamic content with a higher potential conversion metric, according to the methods and systems described herein. In one embodiment, the system described herein comprises data related to which attributes for the dynamic content convert well—e.g. colors, size, etc. Knowing what the current attributes are, the system can make a recommendation for a higher-scoring dynamic content to the user.

Processing logic may optionally provide, via the GUI, an interactive representation of a timeline associated with a dynamic heatmap overlaid on the website, wherein only user interactions within an active time period of the timeline are provided for display on the dynamic heatmap. Furthermore, processing logic may optionally generate a filtered subset of the first and second plurality of user interactions corresponding to a device characteristic and provide, to the client device for display, the GUI including a filtered dynamic heatmap overlaid on the website. In one embodiment, the filtered dynamic heatmap identifies the filtered subset of the first and second plurality of interactions in real-time.

Figure 5:
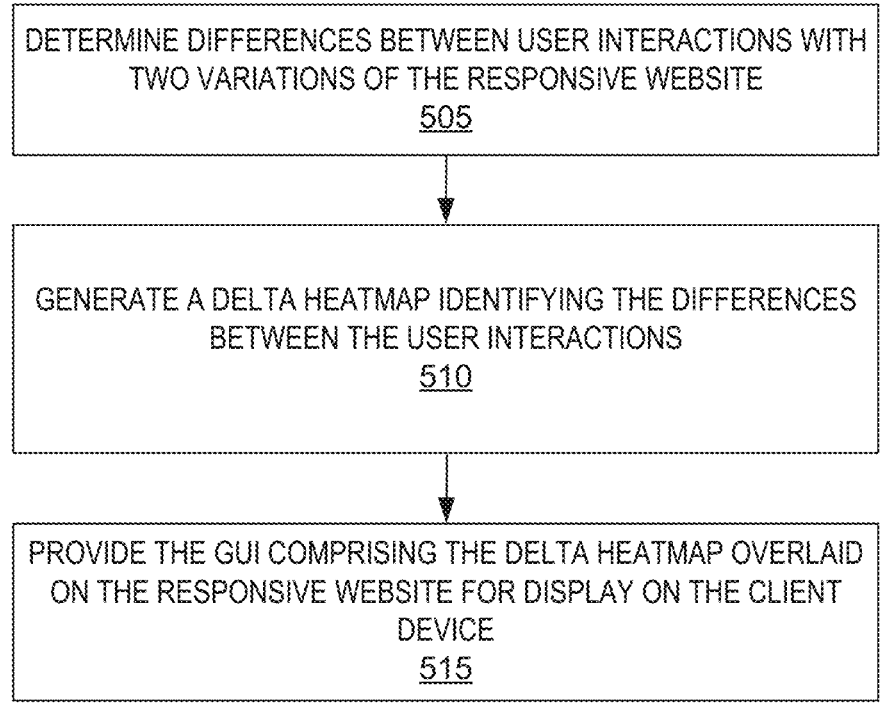
FIG. 5 is a second flow diagram of a method of a dynamic heatmap generation for dynamic content of responsive websites, according to one embodiment.

FIG. 5 is a second flow diagram of a method 500 of a dynamic heatmap generation for dynamic content of responsive websites, according to one embodiment. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by the components of system 100 of FIG. 1. Some or all of the steps may be performed by other entities in other embodiments. In addition, other embodiments may include different and/or additional steps, and the steps may be performed in different orders.

In one embodiment, the steps of FIG. 5 may be performed by processing logic of experiment system 105 of FIG. 1. For example, in one embodiment, processing logic at block 505 determines differences between user interactions with two variations (e.g., variations 200A and 200B of FIGS. 2A and 2B) of the responsive website. At block 510, processing logic generates a delta heatmap identifying the differences between the user interactions. At block 515, processing logic provides the GUI comprising the delta heatmap overlaid on the responsive website for display on the client device (e.g., client device 102A). For example, if a first variation of a website receives five clicks more than a control version on a particular element, the delta heatmap may show a "plus 5" for that element. In another embodiment, if a first variation of a website receives five clicks less than a control version on the particular element, the delta heatmap may show a "minus 5" for that element.

Figure 6A:
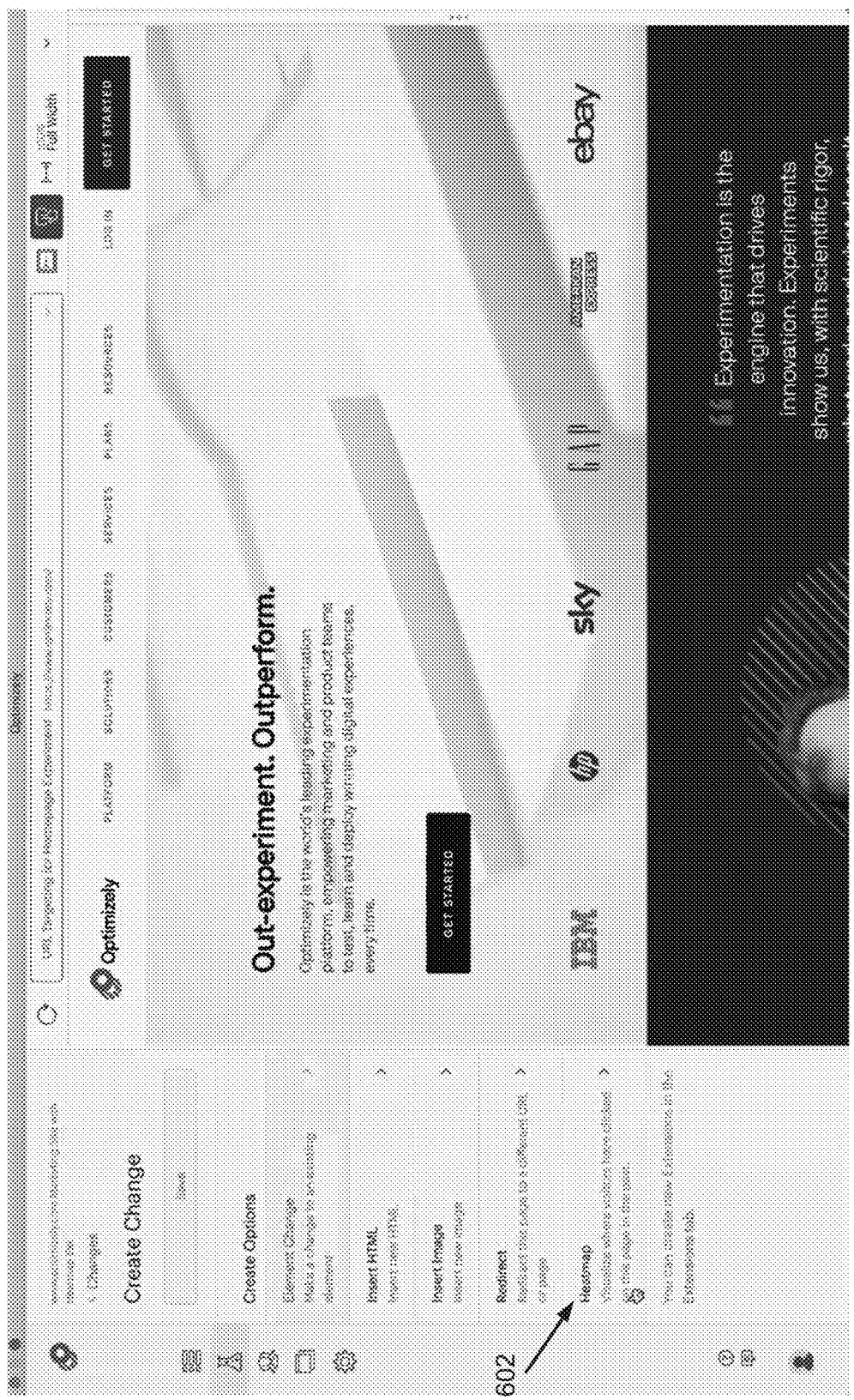
FIGS. 6A-6F are block diagrams illustrating a graphical user interface (GUI) that may be employed to generate and display a dynamic heatmap for dynamic content of responsive websites, according to one embodiment.

FIGS. 6A-6F are block diagrams illustrating a graphical user interface (GUI) that may be employed to generate and display a dynamic heatmap for dynamic content of responsive websites, according to one embodiment. GUI 600A of FIG. 6A, illustrates an option 602 to activate dynamic heatmap functionality to be displayed on the client device. In one embodiment, option 602 is provided via a browser extension. Worth noting, option 602 simply activates the display of the dynamic heatmap for a particular user/client device, and does not globally activate/deactivate the functionality for all users. Such functionality may be globally activated and deactivated on the backend e.g., via experiment system 105 of FIG. 1.

Figure 6B:
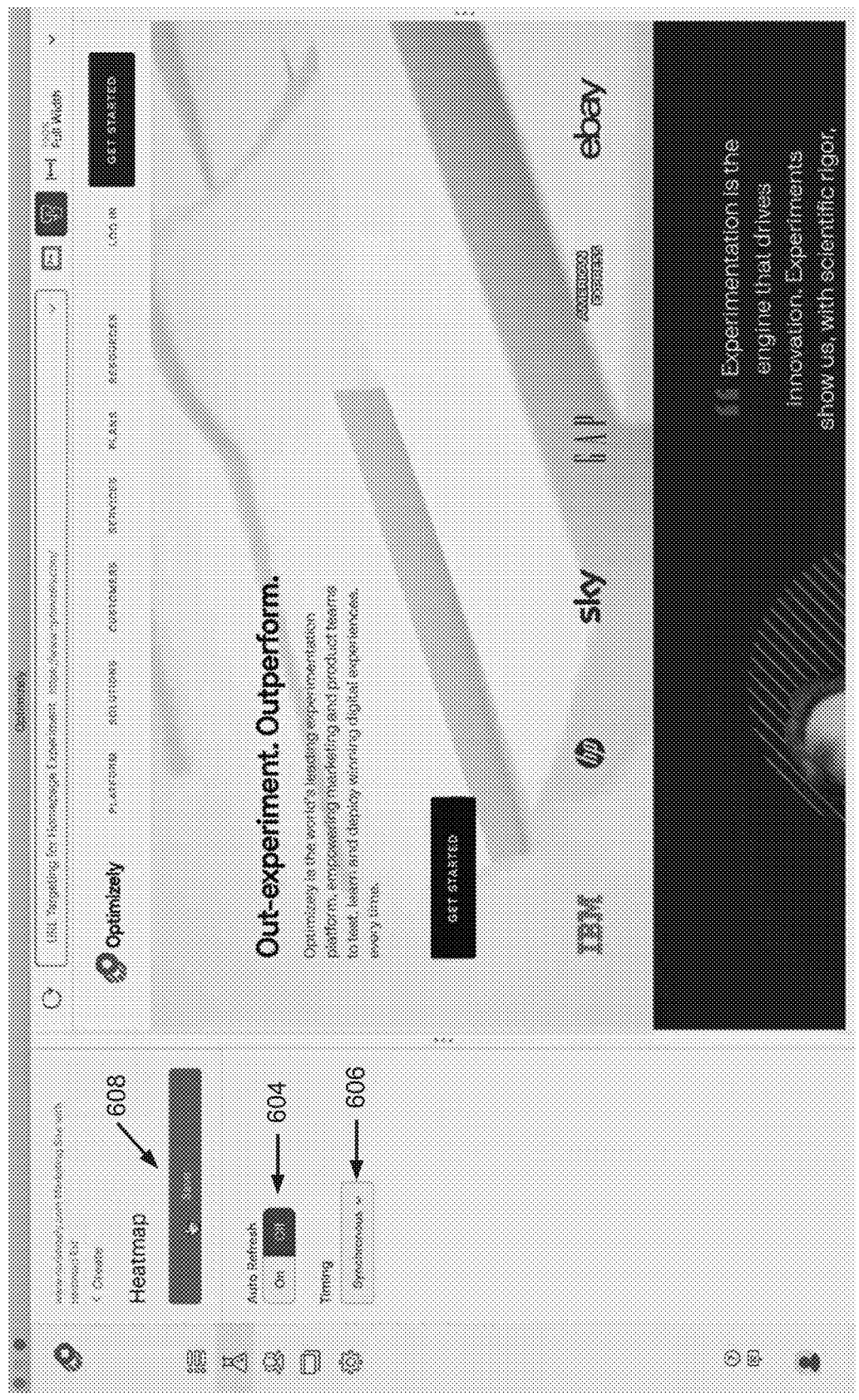
Figure 6C:
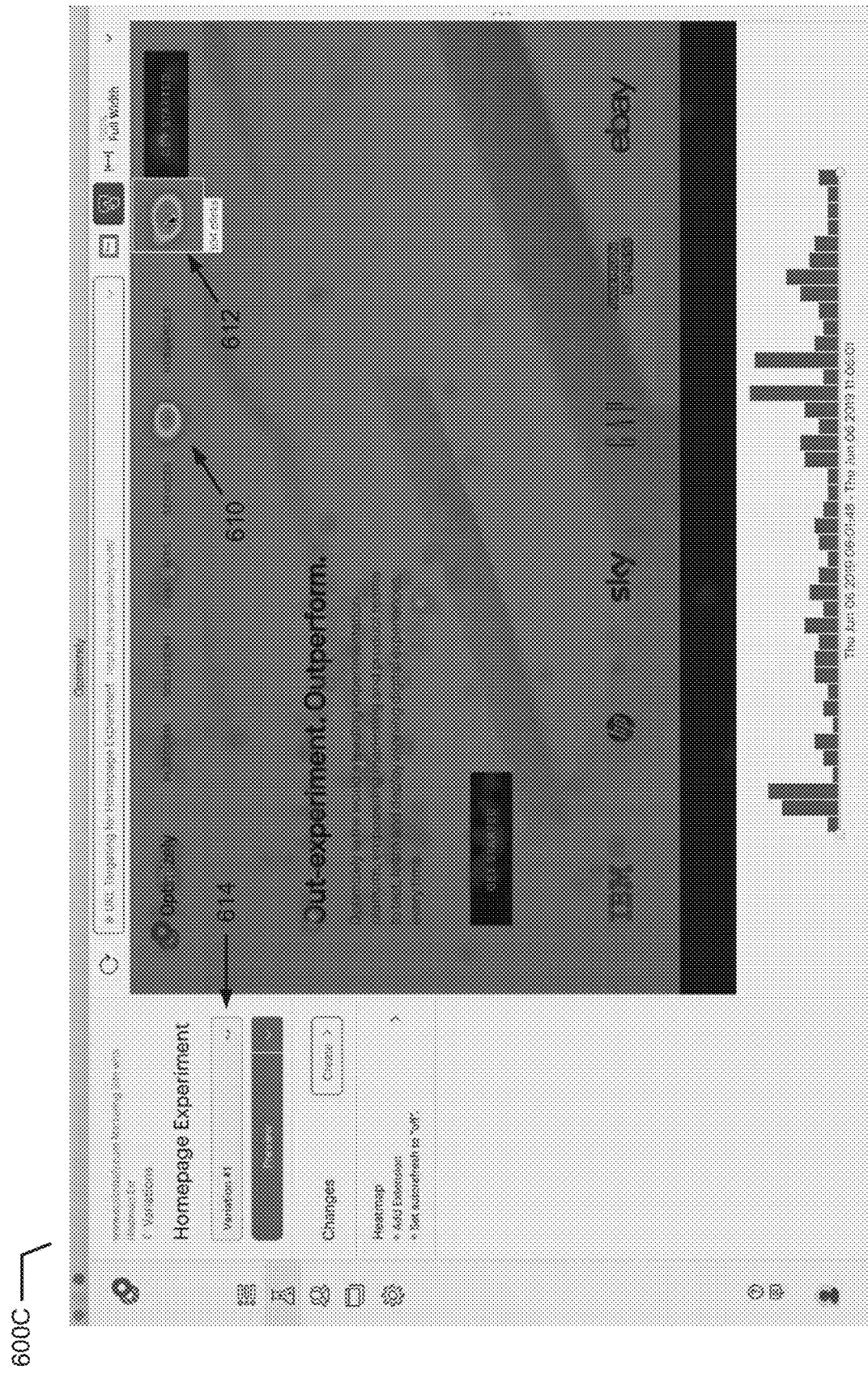

Once dynamic heatmap functionality is enabled on a client device, GUI 600B of FIG. 6B illustrates a variety of options that may be presented to a user. In one embodiment, the heatmap may be set to auto refresh (e.g., update dynamically when users interact with the webpage, as described herein) or only refresh upon manual page refresh 604. In another embodiment, GUI 600B may provide an option to set synchronous or asynchronous timing 606. Options may be saved via a "save" element 608 on the GUI 600B.

Once activated, a dynamic heatmap may be displayed on top of the website. The dynamic heatmap may include any number of hotspots—areas of concentrated user activity such as 610 and 612 of GUI 600C/FIG. 6C. Hotspots may be represented by a variety of colors, patterns, text or images, or any other suitable graphical element. In one embodiment, hovering over a graphical element of a webpage may cause the GUI 600C to display, in text, a user action associated with the graphical element and a number of times that user action has been performed with respect to the graphical element. For example, hovering over graphical element (and corresponding hotspot) 612 causes the GUI 600C to display "104 clicks," indicating that users have clicked on the graphical element 612 104 times over the active time period, as discussed below.

When the dynamic heatmap is used in conjunction with variant testing, as described herein, variant options may be selected via a drop-down menu 614 or other suitable element of GUI 600C. Selecting a variant may cause GUI 600C to display the corresponding version of the website and associated heatmap.

Figure 6D:
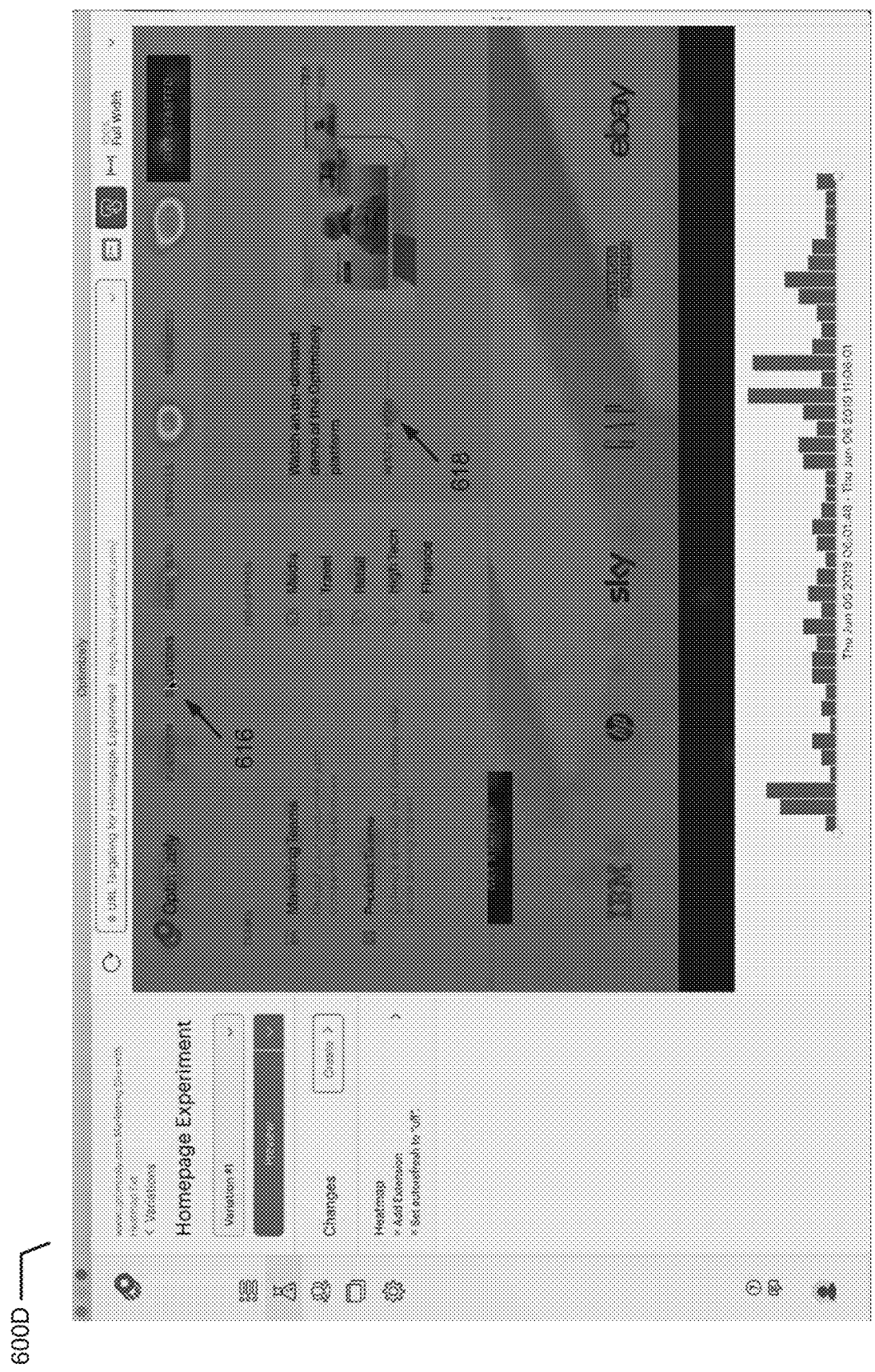
Figure 6E:
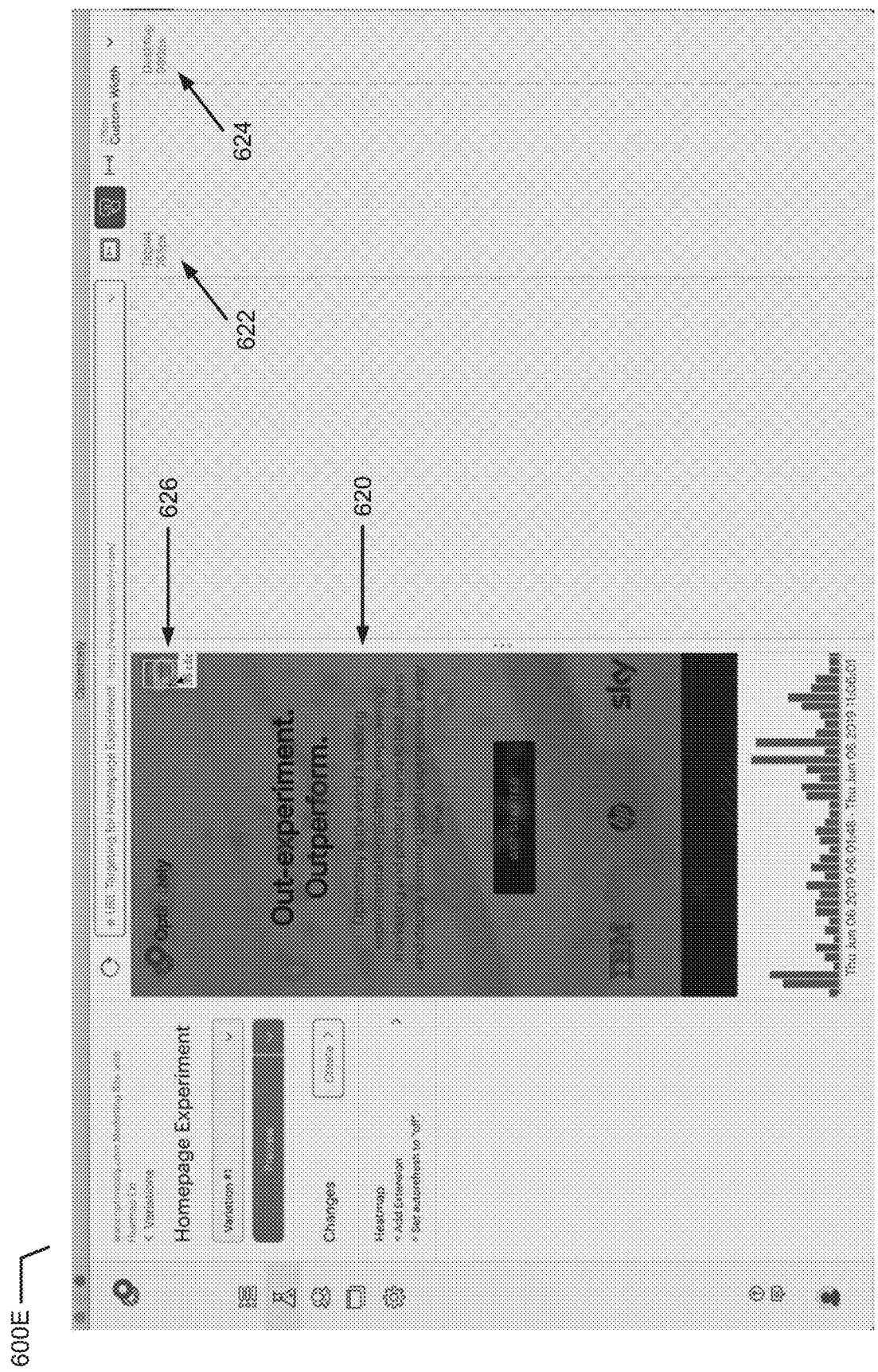

As described herein, the dynamic heatmap may be used to show real-time user interaction with a responsive, dynamic website. GUI 600D of FIG. 6D illustrates an example in which a user hovers over a menu item 616 to reveal previously hidden drop-down menu options, including 618. As shown, the dynamic heatmap refreshes to correctly illustrate hotspots over dynamic elements of a webpage when the elements change.

The dynamic heatmap, in addition to adapting to changing dynamic content, is able to adapt to changing conditions of a responsive website. For example, as shown in GUI 600E of FIG. 6E, as a browser window is resized, the responsive website modifies the underlying dynamic components. When the browser detects display of a particular size, the website is modified to show websites designed for mobile devices 620, tablets 622, and desktops 624. Each variation of the website may include different content, in different locations. Advantageously, the dynamic heatmap functionality described herein is equally capable of being utilized on any device size, and adjusts dynamically to correctly illustrate user interactions with the various versions. As shown, a hotspot 626 is illustrated on the mobile device 620 version of the website where there was no hotspot before. As the window is resized through the various versions of the website, the dynamic heatmap overlay is correspondingly modified in real-time to accurately reflect accurate user interactions with the currently-displayed version.

Figure 6F:
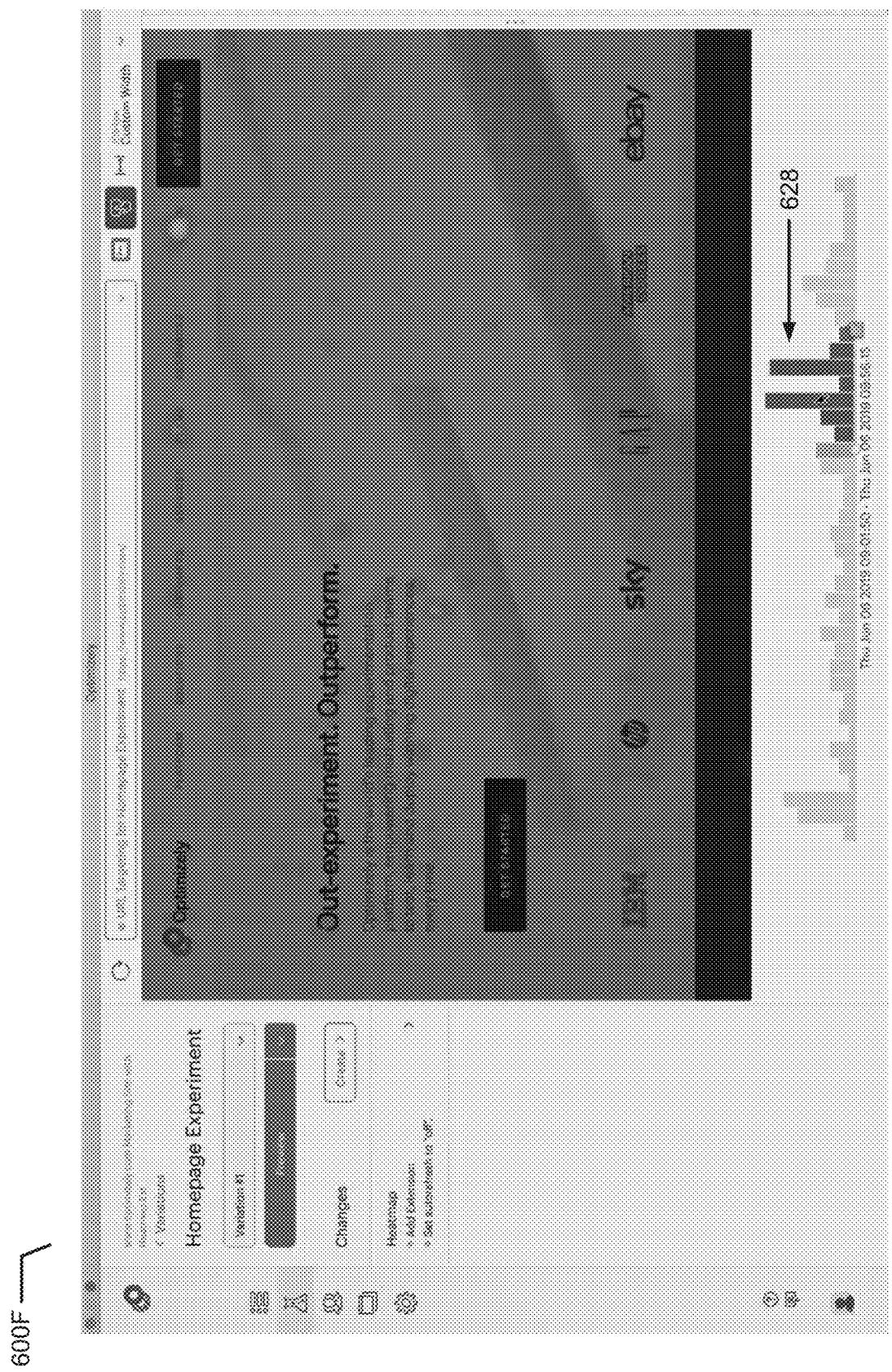

As shown in GUI 600F of FIG. 6F, an interactive time-period graphic is displayed. In one embodiment, the time-period graphic illustrates user-interaction over time. A user may drag, or otherwise modify, the time-period graphic to adjust the active period—e.g., the period for which the dynamic heatmap illustrates user interaction. In the example 628 shown, a subset of time has been selected from the larger time-period graphic, effectively limiting the dynamic heatmap to display only results within the selected time period. In other embodiments, additional filtering criteria may be presented to a user for selection. Advantageously, being able to filter dynamic heatmap results by time, device characteristics, user preferences, etc. results in an efficient tool for focused analysis.

Figure 7:
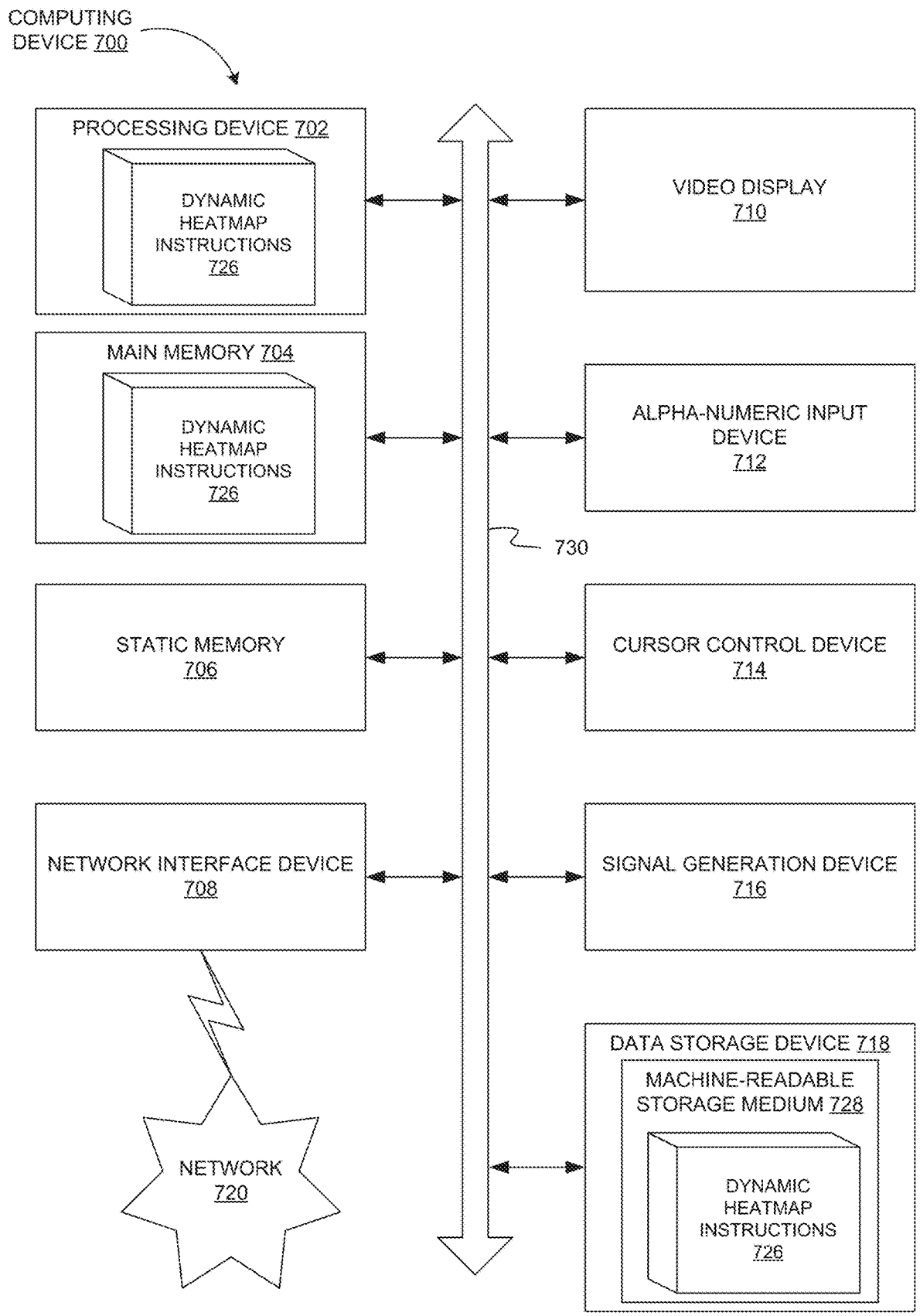
FIG. 7 is a block diagram of a computing device, in accordance with some embodiments of the present disclosure.

FIG. 7 is a block diagram of an example computing device 700 that may perform one or more of the operations described herein, in accordance with some embodiments. In various embodiments, computing device 700 may represent computing devices (e.g., servers) of the experimentation platform, third-party content provider client devices, and/or third-party content provider servers. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of dynamic heatmap instructions 726, e.g., instructions for carrying out the operations described herein, in accordance with one or more aspects of the present disclosure. Dynamic heatmap instructions 726 may also reside, completely or at least partially, within main memory 704 and/or within processing device 702 during execution thereof by computing device 700, main memory 704 and processing device 702 also constituting computer-readable media. The instructions 726 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   providing a first variation of a content item of a website comprising first dynamic content to a first plurality of users, wherein the first dynamic content comprises content that changes based on interaction, behavior, preferences, or interests of a respective one of the first plurality of users or a user device of the respective one of the first plurality of users;
   providing a second variation of the content item of the website comprising second dynamic content to a second plurality of users, wherein the second dynamic content comprises content that changes based on interaction, behavior, preferences, or interests of a respective one of the second plurality of users or a user device of the respective one of the second plurality of users;
   detecting a first plurality of user interactions for the first dynamic content of the first variation of the content item of the website by the first plurality of users;
   detecting a second plurality of user interactions for the second dynamic content of the second variation of the content item of the website by the second plurality of users;
   providing a graphical user interface (GUI) comprising a dynamic delta heatmap overlaid on the content item that illustrates differences between the first plurality of user interactions with the first variation of the content item and the second plurality of user interactions with the second variation of the content item to a client device;
   determining a correlation between the first and second plurality of user interactions and a conversion metric;
   determining, by a processing device, that the first dynamic content has a higher conversion metric than the second dynamic content; and
   sending a first variation recommendation for the first dynamic content to the client device.

2. The method of claim 1, further comprising receiving an attribute corresponding to the first or second dynamic content from the client device.

3. The method of claim 2, further comprising:
   generating a recommendation for changes to the first or second dynamic content based on the attribute; and
   providing the recommendation to the client device.

4. The method of claim 2, wherein the attribute comprises text to be displayed with the corresponding first or second dynamic content, and wherein the method further comprises generating a value score based on text.

5. The method of claim 4, further comprising providing a recommendation for improved text corresponding to a higher value score to the client device.

6. The method of claim 1, further comprising providing, via the GUI, an interactive representation of a timeline associated with the dynamic delta heatmap overlaid on the website, wherein only user interactions within an active time period of the timeline are provided for display on the dynamic delta heatmap.

7. The method of claim 1, further comprising:
   generating a filtered subset of the first and second plurality of user interactions corresponding to a device characteristic of the user devices of the first plurality of users and the user devices of the second plurality of users; and providing, to the client device for display, the GUI comprising a filtered dynamic delta heatmap overlaid on the website, the filtered dynamic delta heatmap identifying the filtered subset of the first and second plurality of interactions in real-time.

8. A system comprising:

a memory to store a graphical user interface (GUI); and a processing device, operatively coupled to the memory, to:

provide a first variation of a content item of a web site comprising first dynamic content to a first plurality of users, wherein the first dynamic content comprises content that changes based on interaction, behavior, preferences, or interests of a respective one of the first plurality of users or a user device of the respective one of the first plurality of users;

provide a second variation of the content item of the website comprising second dynamic content to a second plurality of users, wherein the second dynamic content comprises content that changes based on interaction, behavior, preferences, or interests of a respective one of the second plurality of users or a user device of the respective one of the second plurality of users;

detect a first plurality of user interactions for the first dynamic content of the first variation of the content item of the website by the first plurality of users;

detect a second plurality of user interactions for the second dynamic content of the second variation of the content item of the website by the second plurality of users;

provide the GUI comprising a dynamic delta heatmap overlaid on the content item that illustrates differences between the first plurality of user interactions with the first variation of the content item and the second plurality of user interactions with the second variation of the content item to a client device;

determine a correlation between the first and second plurality of user interactions and a conversion metric;

determine that the first dynamic content has a higher conversion metric than the second dynamic content; and send a first variation recommendation for the first dynamic content to the client device.

9. The system of claim 8, the processing device further to receive an attribute corresponding to the first or second dynamic content from the client device.

10. The system of claim 9, the processing device further to:

generate a recommendation for changes to the first or second dynamic content based on the attribute; and provide the recommendation to the client device.

11. The system of claim 9, wherein the attribute comprises text to be displayed with the corresponding first or second dynamic content, and wherein the processing device is further to generate a value score based on text.

12. The system of claim 11, the processing device further to provide a recommendation for improved text corresponding to a higher value score to the client device.

13. The system of claim 8, the processing device further to provide, via the GUI, an interactive representation of a timeline associated with the dynamic delta heatmap overlaid on the website, wherein only user interactions within an active time period of the timeline are provided for display on the dynamic delta heatmap.

14. The system of claim 8, the processing device further to:

generate a filtered subset of the first and second plurality of user interactions corresponding to a device characteristic of the user devices of the first plurality of users and the user devices of the second plurality of users; and provide, to the client device for display, the GUI comprising a filtered dynamic delta heatmap overlaid on the website, the filtered dynamic delta heatmap identifying the filtered subset of the first and second plurality of interactions in real-time.

15. A non-transitory computer-readable storage medium including instructions that, when executed by a processing device, cause the processing device to:

provide a first variation of a content item of a web site comprising first dynamic content to a first plurality of users, wherein the first dynamic content comprises content that changes based on interaction, behavior, preferences, or interests of a respective one of the first plurality of users or a user device of the respective one of the first plurality of users;

provide a second variation of the content item of the website comprising second dynamic content to a second plurality of users, wherein the second dynamic content comprises content that changes based on interaction, behavior, preferences, or interests of a respective one of the second plurality of users or a user device of the respective one of the second plurality of users;

detect a first plurality of user interactions for the first dynamic content of the first variation of the content item of the website by the first plurality of users;

detect a second plurality of user interactions for the second dynamic content of the second variation of the content item of the website by the second plurality of users;

provide a graphical user interface (GUI) comprising a dynamic delta heatmap overlaid on the content item that illustrates differences between the first plurality of user interactions with the first variation of the content item and the second plurality of user interactions with the second variation of the content item pluralities of user interactions with the first and second variations of the content item, respectively, to a client device;

determine a correlation between the first and second plurality of user interactions and a conversion metric;

determine, by the client device, that the first dynamic content has a higher conversion metric than the second dynamic content; and send a first variation recommendation for the first dynamic content to the client device.

16. The non-transitory computer-readable storage medium of claim 15, the processing device further to receive an attribute corresponding to the first or second dynamic content from the client device.

17. The non-transitory computer-readable storage medium of claim 16, the processing device further to:

generate a recommendation for changes to the first or second dynamic content based on the attribute; and provide the recommendation to the client device.

18. The non-transitory computer-readable storage medium of claim 16, wherein the attribute comprises text to be displayed with the corresponding first or second dynamic content, and wherein the processing device is further to:

generate a value score based on text; and provide a recommendation for improved text corresponding to a higher value score to the client device.

19. The non-transitory computer-readable storage medium of claim 15, the processing device further to provide, via the GUI, an interactive representation of a timeline associated with the dynamic delta heatmap overlaid on the website, wherein only user interactions within an active time period of the timeline are provided for display on the dynamic delta heatmap.

20. The non-transitory computer-readable storage medium of claim 15, the processing device further to:

generate a filtered subset of the first and second plurality of user interactions corresponding to a device characteristic of the user devices of the first plurality of users and the user devices of the second plurality of users; and provide, to the client device for display, the GUI comprising a filtered dynamic delta heatmap overlaid on the website, the filtered dynamic delta heatmap identifying the filtered subset of the first and second plurality of interactions in real-time.

\* \* \* \* \*